3,265,149
CONTROL MECHANISM FOR VEHICLES
John R. Schuetz, Wausau, Wis., assignor to Drott Manufacturing Corporation, Milwaukee, Wis., a corporation of Wisconsin
Filed Dec. 14, 1964, Ser. No. 418,011
10 Claims. (Cl. 180—77)

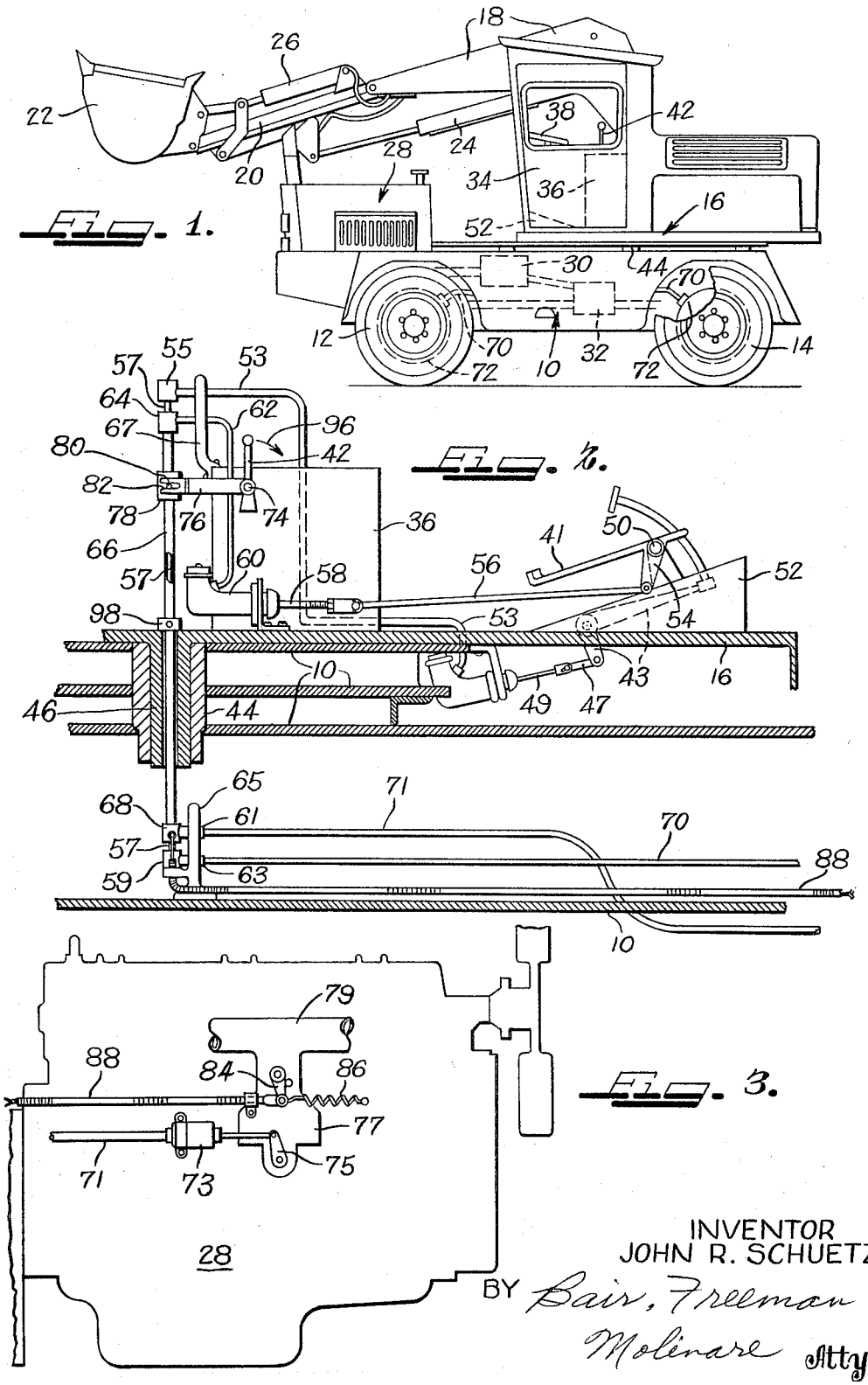

This invention relates to control mechanism for material handling vehicles wherein one or more control devices are hydraulically operated and another is mechanically operated, and wherein an operator's cab is swivelly mounted on the vehicle, yet it is desirable to effect control of the hydraulically and mechanically actuated devices regardless of the direction which the operator faces without unduly complicating the swivel connection.

Material handling vehicles have heretofore been proposed in which an upper frame carries a material handling device and an operator's compartment or cab, the upper frame being mounted for swivelling about a vertical axis on a lower frame supported on driving and steering wheels. In such vehicles the upper and lower frames generally have one relatively aligned position for transport and a second position (usually reversed) for operation of the material handling device. In other words, the upper frame is turned to work off the back or rear side portions of the lower frame for most operations. This means that the brake, throttle and choke controls of such a vehicle must work in a similar manner whether the operator's cab is facing forward or backward.

It is, accordingly, one of the objects of the present invention to provide a control mechanism for vehicles in which the brake pedal, the accelerator pedal and the choke lever can be operated in any rotated position of the operator's cab relative to the lower frame of the vehicle.

More particularly, I propose to provide control mechanism for transferring control movements from the upper to the lower parts of a self-propelled vehicle whose upper and lower parts are relatively rotatable.

A somewhat more specific object of the invention is to provide in combination with a swivel connection that has a bore running downwardly through the center thereof, one or more vertical hydraulic tubes in the bore through which one or more control pedals or the like in the cab of the vehicle propel hydraulic fluid to hydraulically operated devices of the vehicle such as the brakes and the throttle of the carburetor for the engine which propels the vehicle and also in some cases operates material handling mechanism associated with the operator's cab, and another control means such as a lever operable to mechanically move the hydraulic tubes longitudinally through the bore for effecting, through a mechanical connection, the control of another device of the vehicle such as the choke valve of the carburetor.

Another object is to provide means to cause at least one of the vertical hydraulic tubes through the swivel connection to serve a double purpose, thereby using one device (the tube itself) instead of two to perform two separate control functions.

Still another object is to provide a single operative connection between hydraulic parts of the cab and the vehicle, and between mechanical parts of the two, that permits individual operation of either the hydraulic or the mechanical parts without interference by the other.

A further specific object is to provide in the cab of the vehicle master cylinders for supplying hydraulic fluid through the vertical hydraulic tubes to hydraulically actuated brakes and a throttle or the like of the vehicle, and a manually actuated lever operatively connected to one of the tubes for sliding it through the bore of the swivel connection so that the same tube may mechanically actuate some device of the vehicle such as the choke valve of the engine by a Bowden wire control or the like from the lower end of the hydraulic tube to such device.

The above and other objects and features of the invention will be more readily apparent from the following description when read in connection with the accompanying drawing in which:

FIG. 1 is a side elevation of one type of vehicle to which my control mechanism may be applied;

FIG. 2 is an elevation of the control mechanism and associated part of the vehicle shown in section, and FIG. 3 is a outline view of the engine of the vehicle together with a throttle and choke valve control lever of the carburetor thereof.

The vehicle as illustrated generally in FIG. 1 comprises a lower frame 10 supported on wheels 12 and 14 at the front and rear, respectively, of the frame with the front wheels preferably being steerable.

An upper frame indicated generally at 16 is mounted on the lower frame for turning about a vertical swivel axis. The upper frame is so mounted that it can turn through a complete revolution and preferably through more than one revolution for convenience in performing various material handling or loading operations. The upper frame 16 carries a material handling device shown as a shovel mechanism including an arm 18 mounted for swinging in a vertical plane on the upper frame 16, an arm 20 pivoted to the outer end of the arm 18 and a shovel or bucket 22 pivotally carried by the arm 20. The arm 18 is swung vertically by a hydraulic cylinder 24 and the bucket or shovel may be turned about its connection to the arm 20 by a hydraulic cylinder 26.

An engine indicated generally at 28 is mounted on the forward end of the vehicle and is driveably connected to the wheels 12 and 14 through a reversing transmission indicated at 30 and a change speed transmission indicated at 32. It is to be understood that the change speed transmission is connected to driving axles for the wheels through the usual differential devices and driving shafts (not shown).

The several operations of the vehicle and the material handling mechanism thereon may conveniently be controlled by an operator seated in an operator's cab 34 mounted on the upper frame 16. As shown the cab contains an operator's seat 36, a steering wheel 38 for controlling the steerable wheels 12 and various control levers and pedals for controlling other functions of the vehicle. For the purpose of the present invention, I have illustrated two pedals (brake pedal 40 and accelerator pedal 41 in FIG. 2) and a choke control lever 42, since these three are the only controls involved in the present disclosure.

The swivel axis hereinbefore referred to comprises an outer sleeve 44 and an inner sleeve 46 connected to the lower frame 10 and the upper frame 16, respectively, and carrying various communicating passageways and collector rings for hydraulic and electrical connections for the control devices that are provided for controlling other functions of the vehicles than those specifically referred to herein. The center of the inner sleeve 46 has a bore 48 performing an important function in connection with the present invention as will hereinafter appear.

The brake pedal 40 is shown connected to a bell crank 43 pivoted at 45 to a floor board member 52 and operatively connected by a link 47 to a piston rod 49 of a master cylinder 51. The accelerator pedal 41 is pivoted at 50 to the floor board member and provided with a lever 54 which is operatively connected by a link 56 to a piston rod 58 of a master cylinder 60. A hydraulic line 53 extends from the master cylinder 51 to a fixed connection 55 which is fixed to the top of a vertical hydraulic tube 57. A second hydraulic line 62 extends from the master cylinder 60 to a fixed connection 64 which is fixed to the top of a second vertical hydraulic tube 66 which passes downwardly through the bore 48 and is slidable therein. A forked bracket 67 is provided coacting with the hydraulic lines 53 and 62 to insure turning of the tubes 57 and 66 with the upper frame 16 but permits them to slide vertically. The bracket 67 may be secured in any suitable manner to the upper frame.

The tube 57 extends downwardly through the tube 66 and its upper and lower ends are suitably packed or provided with O-rings so that that space in the tube 66 surrounding the tube 57 serves as one hydraulic line connected to the line 62 and the tube 57 itself serves as another hydraulic line connected to the line 53. The lower end of the tube 66 terminates in a swivel connection 68 and the lower end of the tub 57 terminates in a swivel connection 59 which have lateral extensions 61 and 63, respectively, confined in a forked bracket 65 which insures them against rotation relative to the lower frame 10 but permits them to slide vertically. The bracket 65 may be secured in any suitable manner to the lower frame.

The swivel connection 59, 55 has a hydraulic line 70 connected thereto which extends to hydraulic brakes 72 of the wheels 12 and 14. Thus, depression of the brake pedal 40 will result in hydraulic brake action through the conduit system 53, 55, 57, 59, 63 and 70 to the brake cylinders in the brakes 72 in the usual manner, a hydraulic-vacuum booster preferably being interposed between the swivel connection 59, 63 and the brake cylinders.

The swivel connection 68, 61 has a hydraulic line 71 connected thereto which extends to a slave cylinder 73 operable to adjust a throttle lever 75 of a carburetor 77 for the engine 28 as shown in FIG. 3. A section of the intake manifold is also shown at 79.

The choke control lever 42 is pivoted as to the seat 36 by means of a pivot 74 and has a control lever 76 (the levers 42 and 76 forming a bell crank) extending toward the vertical hydraulic tube 66 which has a collar 78 thereon provided with opposite pins 80 received in slots 82 of the lever 76 whereby the tube 66 may be moved longitudianlly in the bore 48 by oscillations of the choke control lever 12.

The purpose of such longitudinal movement is to control the choke valve of the carburertor 77 which, as shown in FIG. 3, has a chock valve arm 84 for actuating the choke valve. The arm 84 is normally held in a non-choke position by a return spring 86, and may be actuated to the choke position by a return spring 86, and may be actuated to the choke position by a Bowden wire control 88. The control 88 extends from the choke valve arm 84 as shown in FIG. 3, to the bracket 65 as shown in FIG. 2 and is operatively connected as at 94 to the swivel connection 68.

It will now be obvious that movement of the choke lever 42 in the direction of the arrow 96 in FIG. 2 for choking the engine will result in lifting the tube 66 and thereby the swivel connection 68 so as to pull on the control 88 and swing the choke arm 84 clockwise against the action of the return spring 86 in order to choke the engine. A construction of the kind described thus uses a hydraulic line (the vertical tube 66) also as a mechanical means to operate the choke control 88, thus reducing the number of parts that have to pass through the swivel connection 44, 46 which is an area of complex character and its simplification is highly desirable. By making the tube 66 perform a double purpose, one control elements extends through the swivel connection instead of two whereas if two were provided the second one would have to be in the form of a sleeve surrounding the first. Thus, one important object of my invention is attained.

The hydraulic lines 53, 62, 70 and 71, of course, are of necessity flexible or have flexible sections so as to permit the longitudinal movement of the vertical hydraulic tubes 57 and 66 without binding or undue resistance under the control of the choke lever 42. Since gravity tends to move the tube downwardly it may be provided with a stop collar 98 to limit the downward movement to correspond to the unchoked position of the choke lever 84.

While I have disclosed the vertical hydraulic tube 57 as provided for the hydraulic brakes of the vehicle, the hydraulic tube 66 for throttle control and the lever 42 as a choke control, it is obvious that the tubes may be for other hydraulic devices on the vehicle while the lever may be for mechanically actuated controls other than the choke of the engine. Wherever hydraulic tubes for one or two control functions and longitudinal movement of the tubes for another control function are possible, the combination disclosed can be advantageously used.

While one embodiment of the invention has been shown and described in detail, it will be understood that this is illustrative only and is not to be taken as a definition of the scope of the invention, reference being had for this purpose to the appended claims.

I claim as my invention:

1. In combination with a vehicle comprising lower and upper frames and a vertical-axis swivel connection between said frames, said lower frame having a hydraulically actuated device and a mechanically actuated device, said swivel connection having an axially extending bore therethrough; a control mechanism comprising a hydraulic tube extending through said bore and terminating above and below said swivel connection, hydraulic actuating means on said upper frame, a hydraulic connection from said hydraulic actuating means to the upper end of said tube, a hydraulic connection from the lower end of said tube to said hydraulically actuated device on said lower frame, mechanical actuating means on said upper frame for reciprocating said hydraulic tube, and a mechanical connection between the lower end of said tube to said mechanically actuated device for actuating the same in response to longitudinal movement of said tube through said bore.

2. A control mechanism for vehicles according to claim 1 wherein one of said hydraulic connections is a swivel connection to permit unrestricted swiveling of said upper frame relative to said lower frame.

3. A control mechanism for vehicles according to claim 1 wherein said hydraulic actuating means is a master cylinder and a brake pedal, and said hydraulically actuated device comprises brakes for said vehicle.

4. A control mechanism for vehicles according to claim 1 wherein said hydraulic actuating means is a master cylinder and an accelerator pedal, and said hydraulically actuated device comprises a throttle for the carburetor of the engine of the vehicle.

5. A control mechanism for vehicles according to claim 1 wherein said mechanical actuating means is a choke lever on said upper frame and said mechanically actuated device is a choke valve lever on the engine of the vehicle.

6. A control mechanism for vehicles according to claim 1 wherein said upper frame has an operator's cab thereon, and said hydraulic actuating means and said mechanical actuating means are mounted in said cab for operation by an operator therein.

7. In a combination with a vehicle comprising lower and upper frames and a vertical-axis swivel connection between said frames, said lower frame having a pair of hydraulically actuated devices and a mechanically actuated device, said swivel connection having an axially extending bore therethrough; a control mechanism comprising a hydraulic tube extending through said bore and terminating above and below said swivel connection, a second hydraulic tube extending through said first hydraulic tube and terminating above and below the ends thereof, a pair of hydraulic actuating means on said upper frame, a pair of hydraulic connections from said hydraulic actuating means to the upper ends of said tubes, a pair of hydraulic connections from the lower ends of said tubes to said hydraulically actuated devices on said lower frame, mechanical actuating means on said upper frame for reciprocating said hydraulic tubes, and a mechanical connection from the lower ends of said tubes to said mechanically actuated device for actuating the same in response to longitudinal movement of said tubes through said bore.

8. A control mechanism for vehicles according to claim 7 wherein said hydraulic connections at one end of said tubes are of swivel type to permit unrestricted swiveling of said upper frame relative to said lower frame.

9. A control mechanism for vehicles according to claim 7 wherein said hydraulic actuating devices are a first master cylinder and a brake pedal, and a second master cylinder and an accelerator pedal, said hydraulically actuated devices are brakes for said vehicle and a throttle for the carburetor of the engine of the vehicle, said mechanical actuating device is a choke lever and said mechanically actuated device is a choke valve lever on the engine of the vehicle.

10. A control mechanism for vehicles according to claim 9 wherein said upper frame has an operator's cab thereon and both of said hydraulic actuating means and said mechanical actuating means are mounted in said cab for operation by an operator therein.

References Cited by the Examiner
UNITED STATES PATENTS

| 2,254,192 | 8/1941 | White | 180—6.58 |
| 2,791,285 | 5/1957 | Linauder | 180—6.58 |

FOREIGN PATENTS

| 744,076 | 10/1932 | France. |
| 974,731 | 4/1961 | Germany. |

A. HARRY LEVY, *Primary Examiner.*